United States Patent [19]
Romanelli

[11] Patent Number: 5,186,406
[45] Date of Patent: Feb. 16, 1993

[54] SPRING ACTUATED TAKE-UP REEL FOR REMOVING CABLE SLACK

[75] Inventor: Marcello J. Romanelli, Dix Hills, N.Y.

[73] Assignee: Grumman Aerospace Corporation, Bethpage, N.Y.

[21] Appl. No.: 733,674

[22] Filed: Jul. 22, 1991

[51] Int. Cl.⁵ .................. B65H 23/00; B65H 16/00
[52] U.S. Cl. .................. 242/54 R; 242/107; 242/86.51; 191/12.2 R
[58] Field of Search ............ 242/54 R, 107.1, 107, 242/86.51; 191/12.2 A, 12.2 R

[56] References Cited

U.S. PATENT DOCUMENTS

| Re. 24,376 | 10/1957 | Buckeridge | 191/12.2 A |
|---|---|---|---|
| 1,153,829 | 9/1915 | Rueckert | 242/107.1 |
| 1,258,507 | 3/1918 | Walton | 242/107 |
| 2,262,587 | 11/1941 | Kaempf | 242/107.1 |
| 2,518,071 | 8/1950 | Rushworth | 242/107.1 |
| 4,126,024 | 11/1978 | Timmons et al. | 242/107 |
| 4,989,805 | 2/1991 | Burke | 242/107.1 |
| 5,022,600 | 6/1991 | Blanc et al. | 242/107.1 |

FOREIGN PATENT DOCUMENTS

| 856639 | 11/1970 | Canada | 242/54 R |
|---|---|---|---|
| 822381 | 10/1951 | Fed. Rep. of Germany | 242/107.1 |
| 1-104579 | 4/1989 | Japan | 242/54 R |
| 478803 | 1/1938 | United Kingdom | 242/107.1 |

Primary Examiner—Daniel P. Stodola
Assistant Examiner—John Q. Nguyen
Attorney, Agent, or Firm—Pollock, VandeSande & Priddy

[57] ABSTRACT

A robotic vehicle is commanded by a fiber optic cable which also delivers television camera images. In the event the vehicle is moved backwards, the creation of a slack length of cable from a storage drum is avoided by the inclusion of a take-up reel in the vehicle. Any slack cable created by backward movement of the vehicle is immediately taken up by the take-up reel so as to prevent cable snags and possible damage by virtue of backward rolling of the vehicle over the cable. During normal forward operation of the vehicle, the take-up reel allows the cable to pass through it without interference.

2 Claims, 2 Drawing Sheets

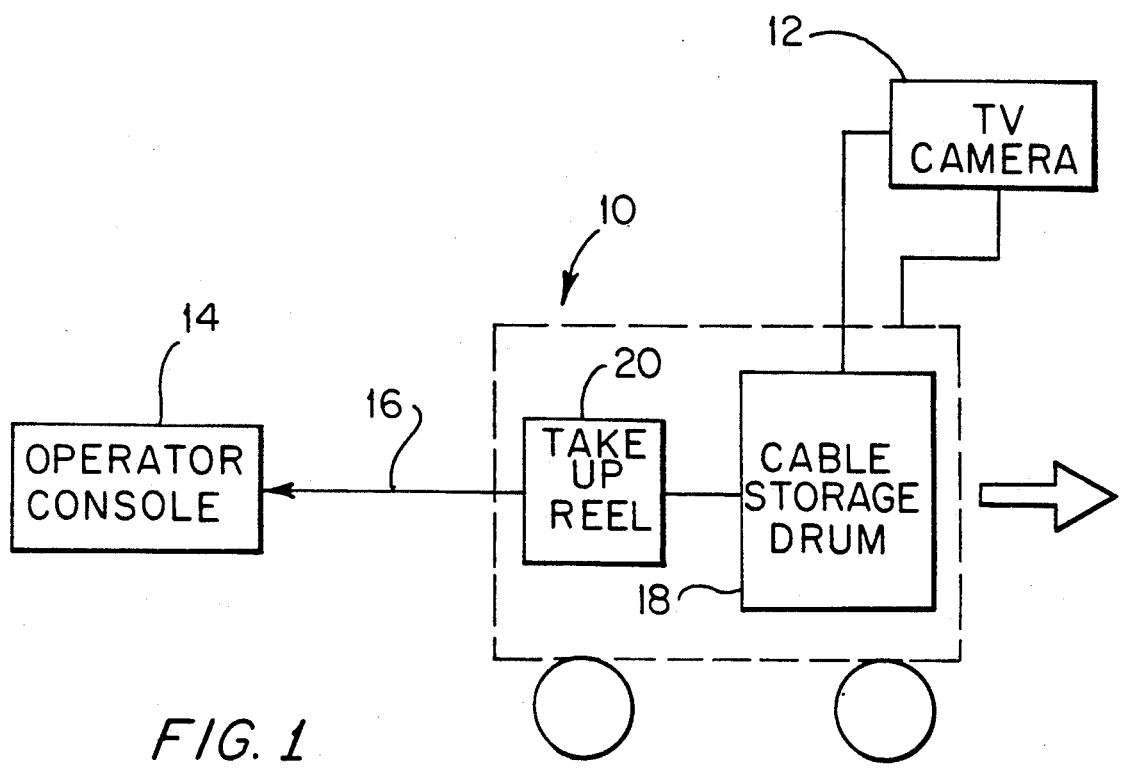
FIG. 1
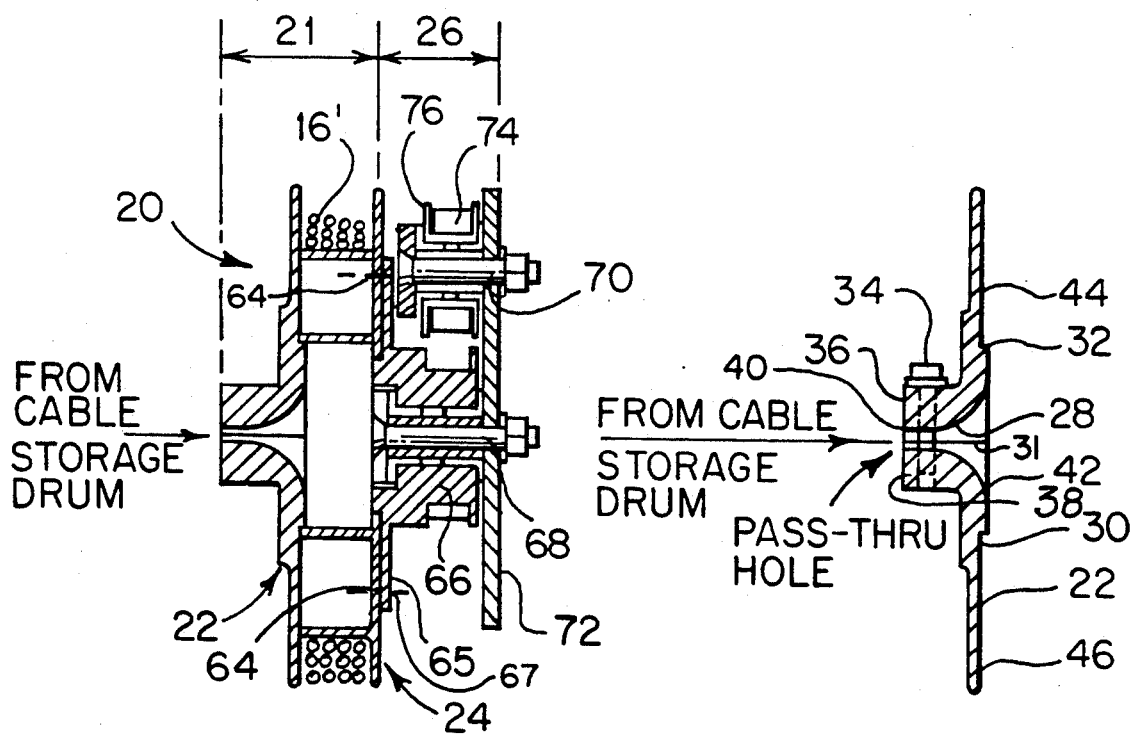
FIG. 2
FIG. 3

SPRING ACTUATED TAKE-UP REEL FOR REMOVING CABLE SLACK

FIELD OF THE INVENTION

The present invention relates to reel mechanisms, and more particularly to such a mechanism in a fiber optic cable pay-out system for eliminating slack.

BACKGROUND OF THE INVENTION

Remotely operated robotic vehicles are used with greater frequency by the military and police. Typically, such a vehicle is provided with a fiber optic cable, or other flexible conduit, which is paid out from a cable storage drum as the vehicle advances. A television or other electronic camera is mounted on the vehicle and provides video information to an operator at the console via the fiber optic cable. The cable may also provide a signal path for sensors or robotic devices mounted on the vehicle. For such types of systems, when a vehicle is commanded to stop and back up for a short distance (i.e., to avoid obstacles) before resuming forward motion, the slack in the cable may become snarled or the vehicle may run over its own cable, causing damage.

BRIEF DESCRIPTION OF THE PRESENT INVENTION

The present invention is designed to avoid the aforementioned problems by incorporating a self-contained take-up reel mechanism, installed in the pay-out system contained in the vehicle, which takes up any slack cable and maintains cable tension. The take-up reel is located downstream of a vehicle contained cable storage drum, relative to the direction of cable pay out to an operator's console. The take-up reel is designed to retrieve a short slack length of a theoretically infinitely long cable and to perform this function as unlimited number of times (subject to the fatigue life of the mechanical elements) along the entire length of the cable. In order to accomplish this, the present invention allows "passthrough" of the cable being paid out from the storage drum during normal forward operation of the vehicle. When the vehicle backs up, the present take-up reel turns in a first rotational direction so as to wind the slackened cable therearound. Upon resuming forward motion, the reel turns in an opposite direction so that the previously wound slack cable becomes unwound from the take-up reel and normal pay-out of the cable from the storage drum continues. The latter situation occurs when the end of the length of slack cable wound on the take-up reel is reached. The reel ceases to turn and the cable continues to be paid out and passes through the take-up reel mechanism.

In a preferred embodiment of the present invention, the take-up reel is actuated by a spiral or clock spring known as a negator. It can, of course, be operated by an electric motor with suitable controls. With the vehicle normally operating in a forward direction, the reel is non-rotating; the spring is cocked or preloaded; and the cable is passed through the take-up reel. When the vehicle stops and backs up, the cocked spring senses a lack of cable tension and drives the reel to take up and store the slack cable length and maintain cable tension. Resuming forward motion exerts a pulling force on the paid-out cable and this overcomes the wind-up force of the spring mechanism. The continued force on the paid-out cable first unwinds the slack length which has been wound on the take-up reel and thereafter the take-up reel stops rotating as the cable is passed through the reel during normal payout. The forward motion also preloads the spring once again to ready it for the next back-up occurrence.

The length of cable to be retrieved is limited only by the diameter and width of the take-up reel, given a particular size of cable. Further, the number of turns afforded by the clock spring (or motor) will affect the slack length of cable that may be taken up.

A further feature of the present invention is the ability to remove paid-out cable from the take-up reel at the end of an operation without cutting the cable. As a result, during training exercises or non-dangerous periods, the storage drum may be removed from the vehicle and installed on an auxiliary winding device to rewind the paid-out cable back onto the cable storage drum. Cable removal from the reel is accomplished by disassembling two mating halves of the take-up reel so that the cable may be disengaged, intact.

BRIEF DESCRIPTION OF THE FIGURES

The above-mentioned objects and advantages of the present invention will be more clearly understood when considered in conjunction with the accompanying drawings, in which:

FIG. 1 is a diagrammatic illustration indicating the principal components of the present invention in terms of a robotic vehicle;

FIG. 2 is a diametric sectional view taken through the assembled take-up reel of the present invention;

FIG. 3 is a sectional view of a funnel employed in the take-up reel of the present invention;

DETAILED DESCRIPTION OF THE INVENTION

Figure 4:
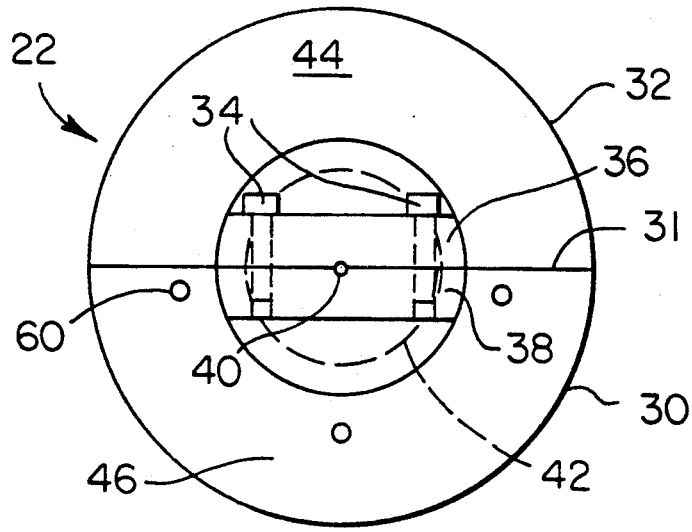
FIG. 4 is a side elevational view of the funnel illustrated in FIG. 3.

Referring to FIG. 1, reference numeral 10 schematically illustrates a robotic vehicle to which a television camera 12 has been mounted. Other sensors or robotic devices may be incorporated into the vehicle but they, per se, do not form part of the present invention. An operator console 14 is designed to control the operation of the vehicle from a distance. Remote control vehicle guidance signals may be communicated to the vehicle along a fiber optic cable 16 which also delivers television signals to the operator console form camera 12. A redundant RF communication link may be incorporated. The fiber optic cable is stored on drum 18 and passes through the take-up reel 20; and as the vehicle moves forward in the indicated direction, the length of paid-out fiber optic cable 16 increases.

The present invention is directed toward the take-up reel 20 which is positioned downstream of the cable storage drum 18 as the vehicle proceeds in a forward direction. When the vehicle moves in the forward direction, the take-up reel 20 remains stationary and allows the stored cable to pass through. However, as previously explained, when the vehicle is commanded to move in a rearward direction, the take-up reel 20 becomes operational and winds the created slack cable thereon so as to maintain constant cable tension. This prevents the cable 16 from becoming snarled or damaged by the vehicle rolling over the cable when moving backwards.

Figure 6:
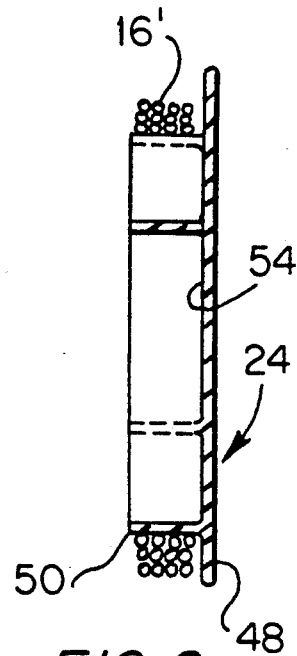
FIG. 6 is a sectional view of the spool illustrated in FIG. 5.

FIG. 2 illustrates a diametrical sectional view taken through a complete take-up reel 20 and is seen to include two basic sections; namely, a reel section 21 and a spring section 26 which powers the reel. The reel section is comprised of a funnel 22 illustrated in FIGS. 3 and 4 and is seen in FIG. 4 to include an upper, generally semicircular half 32 and a lower, generally semicircular half 30 which abut along edge 31. The halves are retained together by suitable fasteners 34. Each half includes a semicircular boss section 36, 38 for receiving the fasteners 34. As clearly shown in FIG. 3, a funnel-shaped recess 28 is axially formed in the funnel with a smaller hole 40 formed at the left indicated end of the funnel while the larger hole 42 occurs at the right illustrated end of the funnel. The upper funnel half is characterized by a large semicircular flange 44 while an opposite semicircular flange 46 is present on the lower half. The combined flange halves form a continuous annular flange, as indicated in FIG. 4. This flange serves as a first take-up reel flange, the second take-up reel flange 48 being illustrated in FIGS. 5 and 6 in the nature of a reel spool 24 which is shown installed in parallel coaxial spaced relationship from the funnel in FIG. 2. When the two are connected together, they form the reel section 21 for accommodating discrete short lengths of slack cable 16' indicated in FIGS. 2 and 6.

Figure 5:
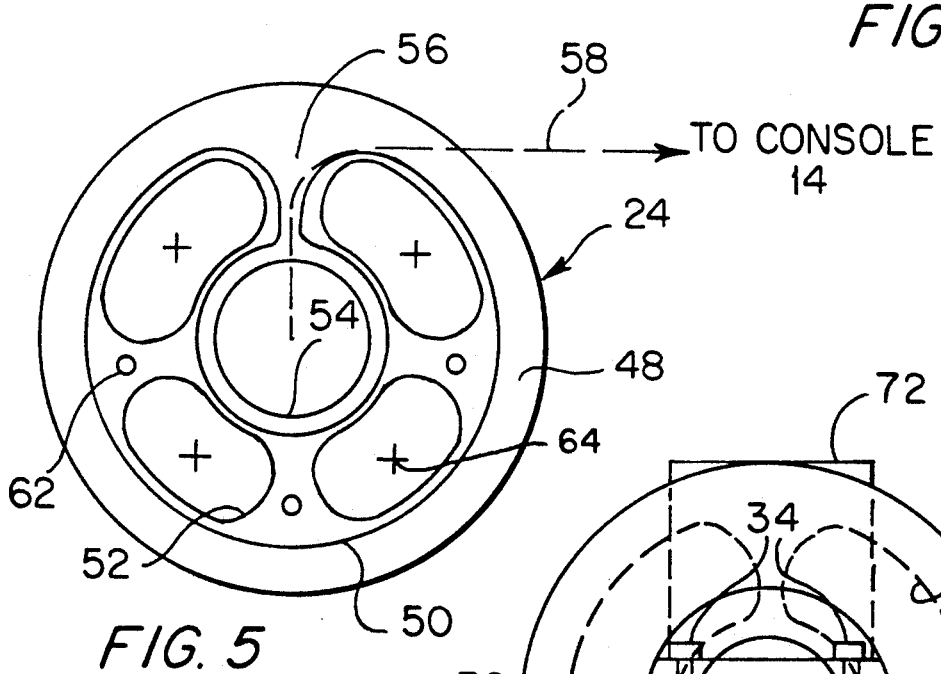
FIG. 5 is a side elevational view of a spool which is fastened in coaxially spaced relationship to the funnel of FIG. 3.
Figure 7:
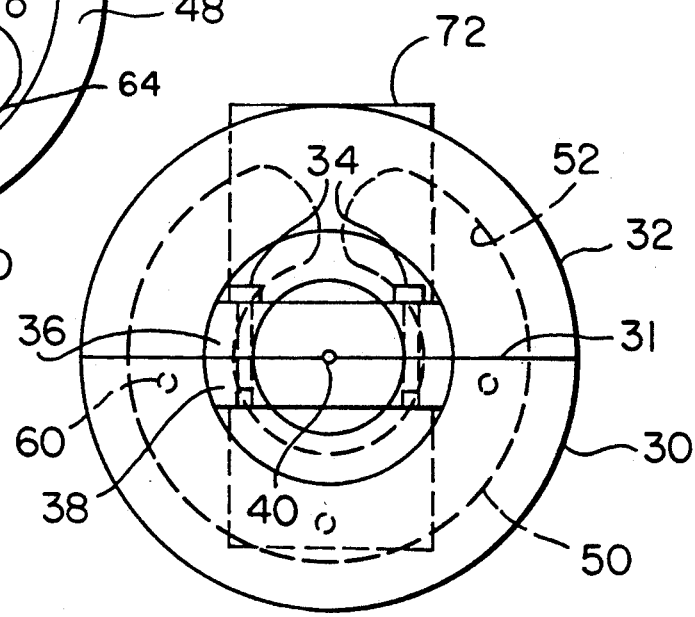
FIG. 7 is a side elevational view of the take-up reel as illustrated in FIG. 2.

The reel spool generally resembles a radially slotted reel, as utilized in open-reel audio tapes or photographic movies. A generally cylindrical central hub 50 includes generally oblong cut-outs 52 formed therein for weight reduction. A central opening 54 is provided to allow the passage of slack cable therethrough to be wrapped around the outer surface of hub 50 after passing through a radial slot 56 formed in the hub. When a robotic vehicle is moving in a normal forward direction, the cable from storage drum 18 (FIG. 1) passes through the funnel-shaped recess 28 (FIG. 3) of funnel 22 and slides through the slot 56 formed in the spool 24 (FIG. 5). After passage through the slot 56, the cable continues to the console 14 along length 58 (FIG. 5). As shown in FIGS. 4 and 5, fastener holes 60, 62 are formed within the lower funnel half 30 (FIG. 4) and a lower half of spool 24 thereby permitting the two members to be secured together thereby forming the take-up reel section 21 (FIG. 2).

The spring section 26 shown in FIG. 2 remains fully biased or cocked when the vehicle is normally moving in the forward direction and when the vehicle is commanded to move backwards, thereby creating slack in the cable, the spring-loaded take-up reel section becomes actuated and winds any slack length 58 (FIG. 5) around the hub 50 of the spool 24. The entrained slack cable is indicated by reference numeral 16' in FIGS. 2 and 6. The spring-loaded take-up reel maintains tension in the paid-out cable so as to avoid snags or running over the cable which may cause damage thereto.

As soon as the robotic vehicle changes its motion to the forward direction, the entrained cable 16' is pulled off, thereby causing counter-rotation of spool 24 (FIG. 5) until all of the previously entrained slack cable is unwound in which case the cable will continue to smoothly pass through the take-up reel section, from the storage drum 18 (FIG. 1). As the take-up section is forced to unwind its previously entrained slack section, the spring section 26 is wound or cocked in preparation of the next backward motion of the vehicle which will again create slack.

Referring to FIG. 2, the spring section 26 is seen to include a spring take-up reel 66 with an outwardly extending annular flange 65 which has openings at 67 which are aligned with respective openings 64 of spool 24 (FIG. 5) so that appropriate fasteners may interconnect the take-up reel section 21 to the spring section take-up reel 66. The spring take-up reel 66 is mounted to a lower shaft 68 while an upper spring storage reel 76 is mounted on a second shaft 70. A clock spring 74 is connected between the storage and take-up spring reels 76 and 66, respectively, so that a completed spring section 26, in the form of a conventional negator is formed. As previously mentioned, the purpose of the spring section 26 is to bias or cock the take-up reel section in much the same way as a spring cocks a conventional spring-loaded steel tape measure. A mounting plate 72 mounts the shafts 70 and 68 of the spring section 26.

In operation of the device, reference is made to FIG. 2, wherein the take-up reel section 21 indicates an entrained length of slack cable 16'. This slack cable was momentarily present in the length of cable between the take-up reel 20 and the operator console 14 (FIG. 1). By virtue of the entrainment of such a slack cable section, a slack condition is actually avoided and constant tension is maintained along the cable 16 (FIG. 1). The entrainment of slack section 16' is powered by the spring section 26 which caused a winding of the slack section around the hub 50 of the spool 24 (FIG. 5). Once the robotic vehicle is moved forward, normal tension is re-applied to the cable 16 thereby causing the take-up reel section to unwind and the previously entrained cable is paid out as length 58 of FIG. 5. When all of the previously entrained cable 16' has been unwound, the take-up reel section 21 (FIG. 2) stops rotating and two conditions now coexist;

(1) the spring section 26 has become fully cocked or loaded in preparation of the next backward motion sequence;

(2) cable continues to be passed through the funnel-shaped recess 28 (FIG. 3) and slot 56 (FIG. 5) so that, in effect, during normal operation of the vehicle, the take-up reel section merely serves as a cable guide.

At any point during the pay-out of cable (and corresponding motion of the vehicle), it is possible to remove the cable form engagement with the take-up reel without cutting the cable. This is useful when, at the end of a training exercise or vehicle operation where no present danger exists, the cable storage drum 18 is, say, only half expended and it is desired to remove the cable storage drum from the vehicle and rewind onto it the spent cable. This is accomplished by disconnecting the upper funnel half 32 from the lower funnel half 30 by the removal of fasteners 34. This action will expose slot 56 of spool 24 and facilitate disengagement of any cable from the take-up reel 20. Removal of the cable from the take-up reel section allows a separate device to rewind the cable onto storage drum 18 thereby enabling re-use of the cable.

Although the present invention has been described in terms of fiber optic cable, it should be understood that the present take-up reel mechanism is equally applicable to electrical cable or other flexible conduit. Further, a preferred embodiment of the present invention has been described in terms of a negator spring. However, appropriately controlled electric motors may also be employed.

It should be understood that the invention is not limited to the exact details of construction shown and described herein for obvious modifications will occur to persons skilled in the art.

I claim:

1. In a robotic vehicle remotely controlled through a cable by an operator console, a vehicle contained cable pay out system comprising:

a take up reel having
- an axial cylindrical section for winding cable therearound when the reel rotates;
- a radial slot formed in the cylindrical section for passing cable therealong when the reel is stationary;
- a coaxial circular first flange extending outwardly from the cylindrical section for restraining wound cable on the cylindrical section;

a funnel member having
- a circular second flange positioned adjacent the axial cylindrical section and in coaxial spaced relation with the first flange for further restraining wound cable on the reel cylindrical section;
- a coaxial funnel-shaped opening formed in the funnel member guiding cable from a narrow opening to a widened opening transversely aligned with the radial slot in the cylindrical section;

a length of cable located in the funnel-shaped opening and the slot, to be paid out through the funnel-shaped opening and the reel when the reel is stationary, and to be wound around the cylindrical section when the reel is rotated thereby removing slack from the cable;

a cable storage drum located in the vehicle for supplying paid out cable to the operator console via the funnel-shaped opening and the take up reel, during forward vehicle movement; and spring means connected to the reel for rotationally biasing the reel in a cable winding direction, the spring means being overcome when a preselected tension occurs in the cable thus enabling unwinding of any wound coil and subsequent passing of the cable through the funnel-shaped opening and the slot of the reel.

2. The reel assembly set forth in claim 1 wherein the funnel member comprises two half sections detachably secured together for permitting disassembly thereof and removal of the cable from the reel.

* * * * *

UNITED STATES PATENT AND TRADEMARK OFFICE
CERTIFICATE OF CORRECTION

PATENT NO. : 5,186,406
DATED : February 16, 1993
INVENTOR(S) : Marcello J. Romanelli It is certified that error appears in the above-identified patent and that said Letters Patent is hereby corrected as shown below:

Column 1, line 38, change "as" to --an--.

Column 2, line 56, change "form" to --from--.

Column 4, line 50, change "form" to --from--.

Signed and Sealed this

Sixteenth Day of November, 1993

Attest:

BRUCE LEHMAN

*Attesting Officer*   Commissioner of Patents and Trademarks